United States Patent
Yokomakura et al.

(10) Patent No.: US 12,225,569 B2
(45) Date of Patent: Feb. 11, 2025

(54) USER EQUIPMENTS, BASE STATIONS AND METHODS FOR TIME DOMAIN CORRELATION INFORMATION REPORTING

(71) Applicant: Sharp Kabushiki Kaisha, Sakai (JP)

(72) Inventors: Kazunari Yokomakura, Vancouver, WA (US); Zhanping Yin, Vancouver, WA (US); Kai Ying, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 17/589,628

(22) Filed: Jan. 31, 2022

(65) Prior Publication Data

US 2023/0247661 A1   Aug. 3, 2023

(51) Int. Cl.
  *H04W 72/542* (2023.01)
  *H04L 5/00* (2006.01)
  *H04W 72/0446* (2023.01)
  *H04W 72/23* (2023.01)

(52) U.S. Cl.
  CPC ......... *H04W 72/542* (2023.01); *H04L 5/0051* (2013.01); *H04W 72/0446* (2013.01); *H04W 72/23* (2023.01)

(58) Field of Classification Search
  CPC ........... H04W 72/542; H04W 72/0446; H04W 72/23; H04W 88/08; H04L 5/0051; H04L 5/0007; H04L 5/0048; H04L 1/0026; H04L 5/0057; H04B 1/16
  See application file for complete search history.

(56) References Cited

U.S. PATENT DOCUMENTS

| | | | |
|---|---|---|---|
| 2018/0062724 A1* | 3/2018 | Onggosanusi | H04B 7/0478 |
| 2019/0174466 A1* | 6/2019 | Zhang | H04L 5/0057 |
| 2022/0116256 A1* | 4/2022 | Shahmohammadian | H04L 27/2675 |
| 2023/0246687 A1* | 8/2023 | Rahman | H04B 7/0639 370/329 |

FOREIGN PATENT DOCUMENTS

| | | |
|---|---|---|
| WO | 2020091543 A1 | 5/2020 |
| WO | 2021225325 A1 | 11/2021 |

OTHER PUBLICATIONS

3GPP TS 38.211 V16.8.0, NR; Physical channels and modulation (Release 16) Dec. 2021.

(Continued)

*Primary Examiner* — Kiet Tang
(74) *Attorney, Agent, or Firm* — Austin Rapp

(57) ABSTRACT

Examples of user equipments (UEs) are described. A UE includes receiving circuitry configured to receive first information to configure one or more channel state information-reference signals (CSI-RS) for tracking and second information to configure time domain correlation related information. The UE also includes transmitting circuitry configured to transmit a channel state information (CSI) report including the time domain correlation related information. A first parameter trs-Info is included in the first information. A second parameter reportQuantity is not set to 'none'. The time domain correlation related information is measured by the one or more CSI-RS for tracking.

3 Claims, 15 Drawing Sheets

| TCI state ID | {RS ID and QCL type} | |
|---|---|---|
| 0 | {SS/PBCH block #0, QCL type A} | {SS/PBCH block #0, QCL type D} |
| 1 | {NZP CSI-RS resource #0, QCL type A} | {NZP CSI-RS resource #0, QCL type D} |
| 2 | {NZP CSI-RS resource #1, QCL type A} | {NZP CSI-RS resource #1, QCL type D} |
| 3 | {NZP CSI-RS resource #2, QCL type A} | {NZP CSI-RS resource #2, QCL type D} |
| 4 | {NZP CSI-RS resource #3, QCL type A} | {NZP CSI-RS resource #3, QCL type D} |
| 5 | {NZP CSI-RS resource #4, QCL type A} | {NZP CSI-RS resource #4, QCL type D} |
| 6 | {NZP CSI-RS resource #5, QCL type A} | {NZP CSI-RS resource #5, QCL type D} |
| 7 | {NZP CSI-RS resource #6, QCL type A} | {NZP CSI-RS resource #6, QCL type D} |

(56) References Cited

OTHER PUBLICATIONS

3GPP TS 38.212 V16.8.0, NR; Multiplexing and channel coding (Release 16) Dec. 2021.
3GPP TS 38.213 V16.8.0, NR; Physical layer procedures for control (Release 16) Dec. 2021.
3GPP TS 38.214 V16.8.0, NR; Physical layer procedures for data (Release 16) Dec. 2021.
3GPP TS 38.321 V16.7.0, NR; Medium Access Control (MAC) protocol specification (Release 16) Dec. 2021.
3GPP TS 38.331 V16.7.0, NR; Radio Resource Control (RRC) protocol specification (Release 16) Dec. 2021.
Samsung, "New WID: MIMO Evolution for Downlink and Uplink", 3GPP TSG RAN Meeting #94e, Electronic Meeting, RP-213598, Dec. 17, 2021.

* cited by examiner

Supported Transmission Numerologies 201

| $\mu$ | $\Delta f = 2^{\mu} \cdot 15 \text{[kHz]}$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | | Slot configuration | | | |
|---|---|---|---|---|---|
| | | 0 | | 1 | |
| $\mu$ | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

| TCI state ID | {RS ID and QCL type} | |
|---|---|---|
| 0 | {SS/PBCH block #0, QCL type A} | {SS/PBCH block #0, QCL type D} |
| 1 | {NZP CSI-RS resource #0, QCL type A} | {NZP CSI-RS resource #0, QCL type D} |
| 2 | {NZP CSI-RS resource #1, QCL type A} | {NZP CSI-RS resource #1, QCL type D} |
| 3 | {NZP CSI-RS resource #2, QCL type A} | {NZP CSI-RS resource #2, QCL type D} |
| 4 | {NZP CSI-RS resource #3, QCL type A} | {NZP CSI-RS resource #3, QCL type D} |
| 5 | {NZP CSI-RS resource #4, QCL type A} | {NZP CSI-RS resource #4, QCL type D} |
| 6 | {NZP CSI-RS resource #5, QCL type A} | {NZP CSI-RS resource #5, QCL type D} |
| 7 | {NZP CSI-RS resource #6, QCL type A} | {NZP CSI-RS resource #6, QCL type D} |

FIG. 6

USER EQUIPMENTS, BASE STATIONS AND METHODS FOR TIME DOMAIN CORRELATION INFORMATION REPORTING

TECHNICAL FIELD

The present disclosure relates generally to communication systems. More specifically, the present disclosure relates to user equipments, base stations and methods for user equipments, base stations and methods for time domain correlation information reporting.

BACKGROUND

Wireless communication devices have become more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

FIG. 6 illustrates an example of transmission configuration indication (TCI) states;

DETAILED DESCRIPTION

Figure 1:
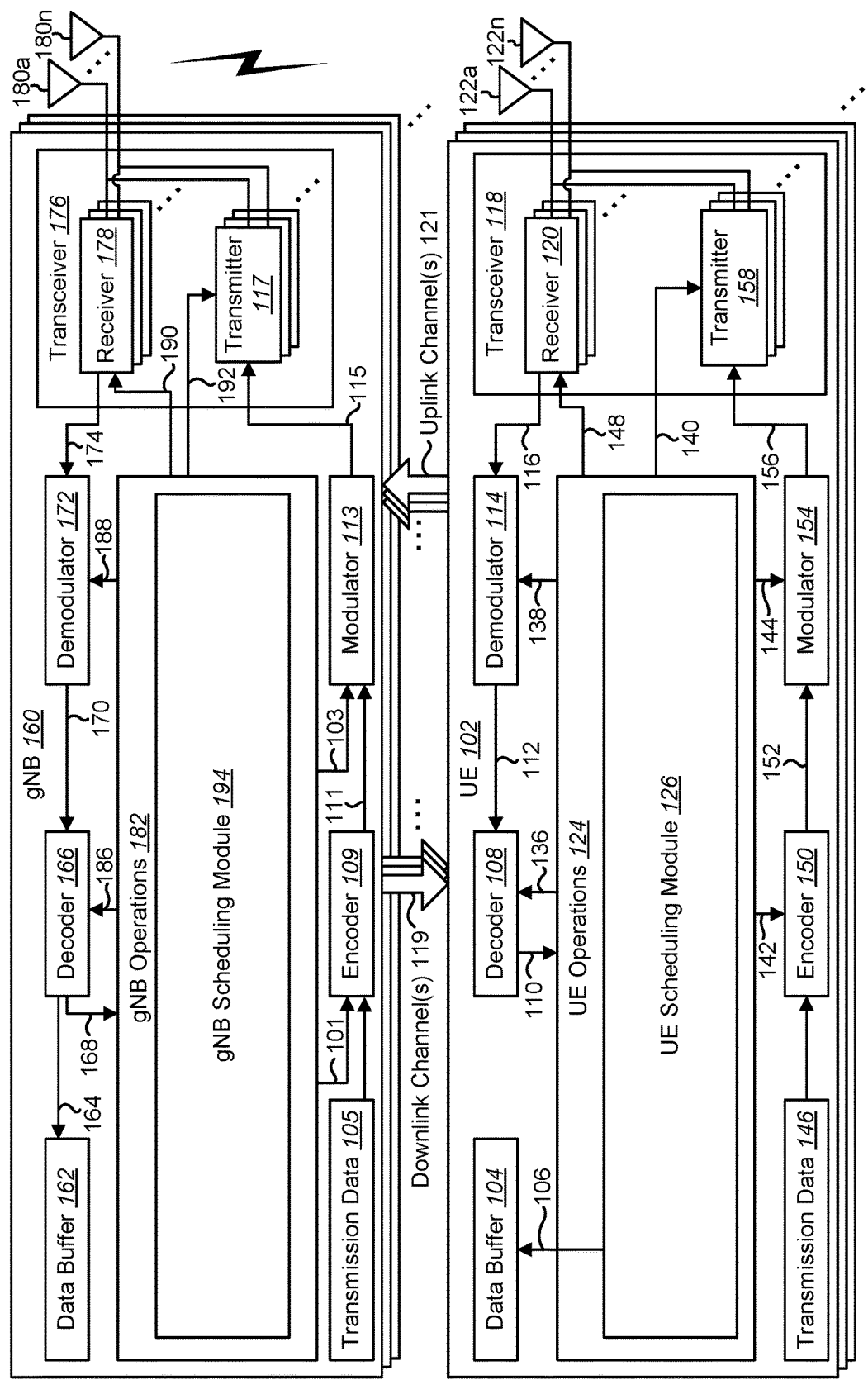
FIG. 1 is a block diagram illustrating one implementation of one or more gNBs and one or more UEs in which systems and methods for signaling may be implemented.

A user equipment (UE) is described. The UE includes receiving circuitry configured to receive first information to configure one or more channel state information-reference signals (CSI-RS) for tracking and second information to configure time domain correlation related information. The UE also includes transmitting circuitry configured to transmit a channel state information (CSI) report including the time domain correlation related information. A first parameter trs-Info is included in the first information. A second parameter reportQuantity is not set to 'none'. The time domain correlation related information is measured by the one or more CSI-RS for tracking.

A base station is also described. The base station includes transmitting circuitry configured to transmit first information to configure one or more CSI-RS for tracking and second information to configure time domain correlation related information. The base station also includes receiving circuitry configured to receive a CSI report including the time domain correlation related information. A first parameter trs-Info is included in the first information. A second parameter reportQuantity is not set to 'none'. The time domain correlation related information is measured by the one or more CSI-RS for tracking.

A communication method of a UE is also described. The method includes receiving first information to configure one or more CSI-RS for tracking and second information to configure time domain correlation related information. The method also includes transmitting a CSI report including the time domain correlation related information. A first parameter trs-Info is included in the first information. A second parameter reportQuantity is not set to 'none'. The time domain correlation related information is measured by the one or more CSI-RS for tracking.

A communication method of a base station apparatus is also described. The method includes transmitting first information to configure one or more CSI-RS for tracking and second information to configure time domain correlation related information. The method also includes receiving a CSI report including the time domain correlation related information. A first parameter trs-Info is included in the first information. A second parameter reportQuantity is not set to 'none'. The time domain correlation related information is measured by the one or more CSI-RS for tracking.

Another UE is described. The UE includes receiving circuitry configured to receive first information to configure one or more CSI-RS for tracking and second information to configure time domain correlation related information. The UE also includes transmitting circuitry configured to transmit a CSI report including the time domain correlation related information. A first parameter trs-Info is included in the first information. A second parameter indicates one of a periodic CSI report, semi-persistent CSI report, and aperiodic CSI report. The time domain correlation related information is measured by the one or more CSI-RS for tracking.

The CSI report including the time domain correlation related information is transmitted based on the second parameter.

Another base station is described. The base station includes transmitting circuitry configured to transmit first information to configure one or more CSI-RS for tracking and second information to configure time domain correlation related information. The base station also includes receiving circuitry configured to receive a CSI report including the time domain correlation related information. A first parameter trs-Info is included in the first information. A second parameter indicates one of a periodic CSI report, semi-persistent CSI report, and aperiodic CSI report. The time domain correlation related information is measured by the one or more CSI-RS for tracking. The CSI report including the time domain correlation related information is received based on the second parameter.

Another communication method of a UE is described. The method includes receiving first information to configure one or more CSI-RS for tracking and second information to configure time domain correlation related information. The method also includes transmitting a CSI report including the time domain correlation related information. A first parameter trs-Info is included in the first information. A second parameter indicates one of a periodic CSI report, semi-persistent CSI report, and aperiodic CSI report. The time domain correlation related information is measured by the one or more CSI-RS for tracking. The CSI report including the time domain correlation related information is transmitted based on the second parameter.

Another communication method of a base station apparatus is also described. The method includes transmitting first information to configure one or more CSI-RS for tracking and second information to configure time domain correlation related information. The method also includes receiving a CSI report including the time domain correlation related information. A first parameter trs-Info is included in the first information. A second parameter indicates one of a periodic CSI report, semi-persistent CSI report, and aperiodic CSI report. The time domain correlation related information is measured by the one or more CSI-RS for tracking. The CSI report including the time domain correlation related information is received based on the second parameter.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), LTE-Advanced Pro and other standards (e.g., 3GPP Releases 8, 9, 10, 11, 12, 13, 14, 15, 16, 17 and/or 18). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a g Node B (gNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. A gNB may also be more generally referred to as a base station device.

It should be noted that as used herein, a "cell" may be any communication channel that is specified by standardization or regulatory bodies to be used for International Mobile Telecommunications-Advanced (IMT-Advanced) or IMT-2020, and all of it or a subset of it may be adopted by 3GPP as licensed bands or unlicensed bands (e.g., frequency bands) to be used for communication between an eNB or gNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and mMTC (massive Machine Type Communication) transmission. And, in NR, transmissions for different services may be specified (e.g., configured) for one or more bandwidth parts (BWPs) in a serving cell and/or for one or more serving cells. A user equipment (UE) may receive a downlink signal(s) and/or transmit an uplink signal(s) in the BWP(s) of one or more serving cells.

In order for the services to use the time, frequency, and/or spatial resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

In some examples, UCI for URLLC may have higher reliability and lower latency than eMBB. Some examples of the techniques described herein may achieve the lower latency in mini-slot repetition by using an earliest DMRS satisfying timing equal to or greater than the indicated timing in repeated PUSCH.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDSCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform (e.g., schedule) downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

Also, in a carrier aggregation (CA), the gNB 160 and the UE 102 may communicate with each other using one or more serving cells. Here the one or more serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. Here, the primary cell may be always activated. Also, the gNB 160 may activate one or more secondary cell within the configured secondary cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

In a radio communication system, physical channels (uplink physical channels and/or downlink physical channels) may be defined. The physical channels (uplink physical channels and/or downlink physical channels) may be used for transmitting information that is delivered from a higher layer.

In some examples, in uplink, a Physical Random Access Channel (PRACH) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUSCH) resource).

In some examples, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). Here, more than one DCI formats may be defined for DCI transmission on the PDCCH. Namely, fields may be defined in the DCI format(s), and the fields are mapped to the information bits (e.g., DCI bits).

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Additionally or alternatively, in a case that the PUSCH (e.g., the PUSCH resource) is scheduled by using the DCI format(s) for the uplink, the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). Here, the RRC message and/or the MAC CE are also referred to as a higher layer signal.

In some approaches, a physical broadcast channel (PBCH) may be defined. For example, the PBCH may be used for broadcasting the MIB (master information block). Here, system information may be divided into the MIB and a number of SIB(s) (system information block(s)). For example, the MIB may be used for carrying include minimum system information. Additionally or alternatively, the SIB(s) may be used for carrying system information messages.

In some approaches, in downlink, synchronization signals (SSs) may be defined. The SS may be used for acquiring time and/or frequency synchronization with a cell. Additionally or alternatively, the SS may be used for detecting a physical layer cell ID of the cell. SSs may include a primary SS and a secondary SS.

An SS/PBCH block may be defined as a set of a primary SS, a secondary SS and a PBCH. Tin the time domain, the SS/PBCH block may include 4 OFDM symbols, numbered in increasing order from 0 to 3 within the SS/PBCH block, where PSS, SSS, and PBCH with associated demodulation reference signal (DMRS) are mapped to symbols. One or more SS/PBCH block may be mapped within a certain time duration (e.g., 5 msec).

Additionally, the SS/PBCH block can be used for beam measurement, radio resource management (RRM) measurement and radio link control (RLM) measurement. Specifically, the secondary synchronization signal (SSS) can be used for the measurement.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer, but may be used by a physical layer.

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

Some techniques for CSI-RS for tracking and time domain correlation and/or Doppler information reporting are described as follows. A UE 102 may be configured with NZP CSI-RS for tracking. The UE 102 may receive information of one or more NZP CSI-RS resource sets (NZP-CSI-RS-ResourceSet) in a RRC message. Each NZP CSI-RS resource set may include information to configure one or more NZP CSI-RS resources (NZP-CSI-RS-Resource).

A UE 102 may be configured with one or more CSI reporting configuration(s). For this purpose, the UE 102 may receive information including one or more CSI report configuration(s) in a RRC message. Each CSI report configuration (CSI-ReportConfig) may include information on CSI-RS resources to perform channel measurement, information on CSI-RS resources for interference measurement, a parameter ReportQuantity, which kind of CSI (e.g., L1-RSRP (Layer-1 Reference Signal Reception Power), PMI (Precoding Matrix Indicator), CQI (Channel Quality Indicator), RI (Rank Indicator), CRI (CSI-RS resource indicator), and/or LI (layer indicator)) is reported by the corresponding CSI report configuration, and a parameter reportConfigType which indicates one of aperiodic CSI reporting, semi-persistent CSI reporting, and/or periodic CSI reporting.

A UE 102 in RRC connected mode may be expected to receive the higher layer UE specific configuration of a NZP-CSI-RS-ResourceSet configured with higher layer parameter trs-Info. For a NZP-CSI-RS-ResourceSet configured with the higher layer parameter trs-Info, the UE 102 may assume the antenna port with the same port index of the configured NZP CSI-RS resources in the NZP-CSI-RS-ResourceSet is the same.

For frequency range 1 (e.g., sub-6 GHz), the UE 102 may be configured with one or more NZP-CSI-RS resource set(s), where a parameter NZP-CSI-RS-ResourceSet may include four periodic NZP CSI-RS resources in two consecutive slots with two periodic NZP CSI-RS resources in each slot. If no two consecutive slots are indicated as downlink slots, by tdd-UL-DL-ConfigurationCommon or tdd-UL-DL-ConfigDedicated, then the UE 102 may be configured with one or more NZP CSI-RS set(s), where a NZP-CSI-RS-ResourceSet may include two periodic NZP CSI-RS resources in one slot.

For frequency range 2, the UE 102 may be configured with one or more NZP CSI-RS set(s), where a NZP-CSI-RS-ResourceSet may include two periodic CSI-RS resources in one slot or with a NZP-CSI-RS-ResourceSet of four periodic NZP CSI-RS resources in two consecutive slots with two periodic NZP CSI-RS resources in each slot.

A UE 102 configured with NZP-CSI-RS-ResourceSet(s) configured with higher layer parameter trs-Info may have the NZP CSI-RS resources configured as periodic, with the CSI-RS resources in the parameter NZP-CSI-RS-ResourceSet configured with same periodicity, bandwidth, and subcarrier location.

A UE 102 configured with NZP-CSI-RS-ResourceSet(s) configured with higher layer parameter trs-Info may have the NZP CSI-RS resources configured as periodic CSI-RS resource in one set and aperiodic CSI-RS resources in a second set, with the aperiodic CSI-RS and periodic CSI-RS resource having the same bandwidth (with same RB location) and the aperiodic CSI-RS being configured with qcl-Type set to 'typeA' and 'typeD', where applicable, with the periodic CSI-RS resources. For frequency range 2, the UE does not expect that the scheduling offset between the last symbol of the PDCCH carrying the triggering DCI and the first symbol of the aperiodic CSI-RS resources is smaller than beamSwitchTiming+d·$2^{\mu_{CSIRS}}/2^{\mu_{PDCCH}}$ in CSI-RS symbols, where the higher layer parameter beamSwitchTiming is a UE reported value, the reported value may be one of the values of {14, 28, 48}, and the beam switching timing delay may be d if $\mu_{PDCCH} < \mu_{CSIRS}$, else d may be zero. The UE 102 may expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset may indicate the triggering offset for the first slot for the first two CSI-RS resources in the set.

A UE 102 may not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

A UE 102 may not expect to be configured with a NZP-CSI-RS-ResourceSet configured both with trs-Info and repetition.

If a UE 102 is configured with a CSI-ReportConfig with the higher layer parameter reportQuantity set to 'none' for aperiodic NZP CSI-RS resource set configured with trs-Info, the UE 102 may receive the NZP CSI-RS for tracking and perform time and frequency channel tracking.

Some examples of techniques for CSI-RS for tracking and time domain correlation and/or Doppler information reporting are provided as follows. A UE 102 may be configured with aperiodic CSI-RS for tracking in a NZP-CSI-RS resource set configured with trs-Info. A UE 102 may be configured with semi-static CSI-RS for tracking in a NZP-CSI-RS resource set configured with trs-Info. A UE 102 may be configured with periodic CSI-RS for tracking in a NZP-CSI-RS resource set configured with trs-Info.

A UE 102 may be configured with a CSI-ReportConfig for periodic NZP CSI-RS resource set configured with trs-Info.

If a UE 102 is not configured with a CSI-ReportConfig for periodic NZP CSI-RS resource set configured with trs-Info, the UE 102 may receive the NZP CSI-RS for tracking and perform time and frequency channel tracking.

A UE 102 may be configured with a CSI-ReportConfig for semi-persistent NZP CSI-RS resource set configured with trs-Info. If a semi-persistent NZP CSI-RS resource set configured with trs-Info is configured, the UE 102 may be configured with a CSI-ReportConfig and a parameter reportQuantity in the CSI-ReportConfig is set to 'TDCI'.

If a UE 102 is configured with a CSI-ReportConfig with the higher layer parameter reportQuantity set to a parameter other than 'none' (e.g., TDCI: Time domain correlation related information), the UE 102 may receive CSI-RS for tracking, perform time and frequency channel tracking, and measure the time domain correlation related information. The UE 102 may transmit time domain correlation information based on the measurement of CSI-RS for tracking. One or more of the following information as TDCI may be defined:

Information about time domain correlation values measured from multiple received CSI-RSs for tracking in a different time-domain transmission/reception occasion;

Information about the differential values between reception power between the received CSI-RSs for tracking in a different time-domain transmission/reception occasion;

Information about the differential values between signal to interference plus noise power ratio (SINR) between the received CSI-RSs for tracking in a different time-domain transmission/reception occasion;

Information about the phase rotation values between the received CSI-RSs for tracking in a different time-domain transmission/reception occasion.

In some examples, each CSI-RS resource may be configured by the higher layer parameter NZP-CSI-RS-Resource with one or more of the following restrictions:

the time-domain locations of the two CSI-RS resources in a slot, or of the four CSI-RS resources in two consecutive slots (which are the same across two consecutive slots), as defined by higher layer parameter CSI-RS-resourceMapping, may be given by one of l∈{4,8}, l∈{5,9}, and/or l∈{6,10} for frequency range 1 (sub 6 GHz) and frequency range 2 (above 6 GHz), and/or l∈{0,4}, l∈{1,5}, l∈{2,6}, l∈{3,7}, l∈{7,11}, l∈{8,12}, and/or l∈{9,13} for frequency range 2 (above 6 GHz).

a single port CSI-RS resource with density ρ=3 given by Table 7.4.1.5.3-1 from TS 38.211 and higher layer parameter density configured by CSI-RS-ResourceMapping.

If carrier $N_{grid}^{size,\mu}$=52, $N_{BWP,i}^{size}$=52, μ=0 and the carrier is configured in paired spectrum, the bandwidth of the CSI-RS resource, as given by the higher layer parameter freqBand configured by CSI-RS-ResourceMapping, may be X resource blocks, where X≥28 resources if the UE indicates trs-AddBw-Set1 for trs-AdditionalBandwith capability and X≥32 if the UE indicates trs-AddBW-Set2 for the AdditionalBandwidth capability; in these cases, if the UE is configured with CSI-RS comprising X<52 resource blocks, the UE 102 may not expect that the total number of PRBs allocated for DL transmissions but not overlapped with the PRBs carrying CSI-RS for tracking is more than 4, where all CSI-RS resource configurations may span the same set of resource blocks; otherwise, the bandwidth of the CSI-RS resource, as given by the higher layer parameter freqBand configured by CSI-RS-ResourceMapping, is the minimum of 52 and $N_{BPW,i}^{size}$ resource blocks, or is equal to $N_{BPW,i}^{size}$ resource blocks. For operation with shared spectrum channel access, freqBand configured by CSI-RS-ResourceMapping, is the minimum of 48 and $N_{BPW,i}^{size}$ resource blocks, or is equal to $N_{BPW,i}^{size}$ resource blocks.

the UE 102 may not be expected to be configured with the periodicity of $2^\mu \times 10$ slots if the bandwidth of CSI-RS resource is larger than 52 resource blocks.

the periodicity and slot offset for periodic NZP CSI-RS resources, as given by the higher layer parameter periodicityAndOffset configured by NZP-CSI-RS-Resource, may be one of $2^\mu X_p$ slots where $X_p$=10, 20, 40, or 80 and where p may be defined in Clause 4.3 of TS 38.211.

Additionally or alternatively, a UE 102 may measure time domain correlation by using CSI-RS for tracking associated with the parameter NZP-CSI-RS-ResourceSet(s) configured with a parameter trs-Info and associated with the parameter CSI-Report-Config(s) configured with reportQuantity as TDCI.

Additionally or alternatively, a UE 102 may measure time domain correlation by using CSI-RS for tracking associated with the parameter NZP-CSI-RS-ResourceSet(s) configured with a parameter trs-Info and associated with the parameter CSI-Report-Config(s) configured with reportQuantity as 'none' and TDCI.

Additionally or alternatively, the parameter reportQuantity set to 'TDCI' may be configured separately from other CSI components (e.g., PMI, CQI, RI, LI, and/or CRI). The parameter reportQuantity set to 'TDCI' may be configured with other CSI components (e.g., PMI, CQI, RI, LI, and/or CRI). In this case, the reportQuantity may be set to another parameter name (e.g., 'TDCI-PMI-CQI-RI' in case that CQI, PMI, RI, and TDCI are reported.

Additionally or alternatively, a UE 102 may be configured with time domain prediction from CSI-RSs for tracking by information provided by a RRC message and reflect the time domain correlation to the reported CSI such as CQI, PMI, RI, LI, and/or CRI. In this case, the parameter reportQuantity in the parameter CSI-ReportConfig associated with CSI-RS for tracking configured by the parameter NZP-CSI-RS-ResourceSet(s) configured with a parameter trs-Info may be set 'none'. Additionally or alternatively, the parameter reportQuantity in the parameter CSI-ReportConfig associated with CSI-RS for tracking configured by the parameter NZP-CSI-RS-ResourceSet(s) configured with a parameter trs-Info may be set TDCI.

Additionally or alternatively, a UE 102 may transmit UE capability information to support a time domain correlation related information measurement. The UE capability may include the maximum number of simultaneous calculation(s) with other CSI components (e.g., L1-RSRP, PMI, CQI, RI, LI, and/or CRI). The UE capability may be defined per each component carrier, each cell, and/or each band.

Additionally or alternatively, the UE capability may include a separate processing time from the measurement of L1-RSRP, PMI, CQI, RI, LI, and/or CRI.

Additionally or alternatively, DCI on a PDCCH may indicate the report of TDCI to a UE 102. A MAC CE may activate the report of TDCI. Additionally or alternatively, the TDCI may be transmitted on a PUSCH and/or PUCCH.

If periodic CSI reporting including TDCI report is configured, a PUCCH or a PUSCH may be used. If semi-persistent CSI reporting including TDCI report is configured, a PUCCH or a PUSCH may be used. If aperiodic CSI reporting including TDCI report is configured, a PUSCH or a PUCCH may be used. Periodic, semi-persistent, and/or aperiodic CSI reporting may be configured by a parameter in a CSI-ReportConfig.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. As shown in FIG. 2, multiple numerologies 201 (e.g., multiple subcarrier spacing) may be supported. For example, µ (e.g., a subcarrier space configuration) and a cyclic prefix (e.g., the µ and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g., 160 Ts or 144 Ts) in a time domain, where Ts denotes a baseband sampling time unit defined as 1/(15000*2048) seconds.

Additionally or alternatively, a number of OFDM symbol(s) 203 per slot ($N_{symb}^{slot}$) may be determined based on the p (e.g., the subcarrier space configuration). Here, for example, a slot configuration 0 (e.g., the number of OFDM symbols 203 per slot may be 14).

Figure 3:
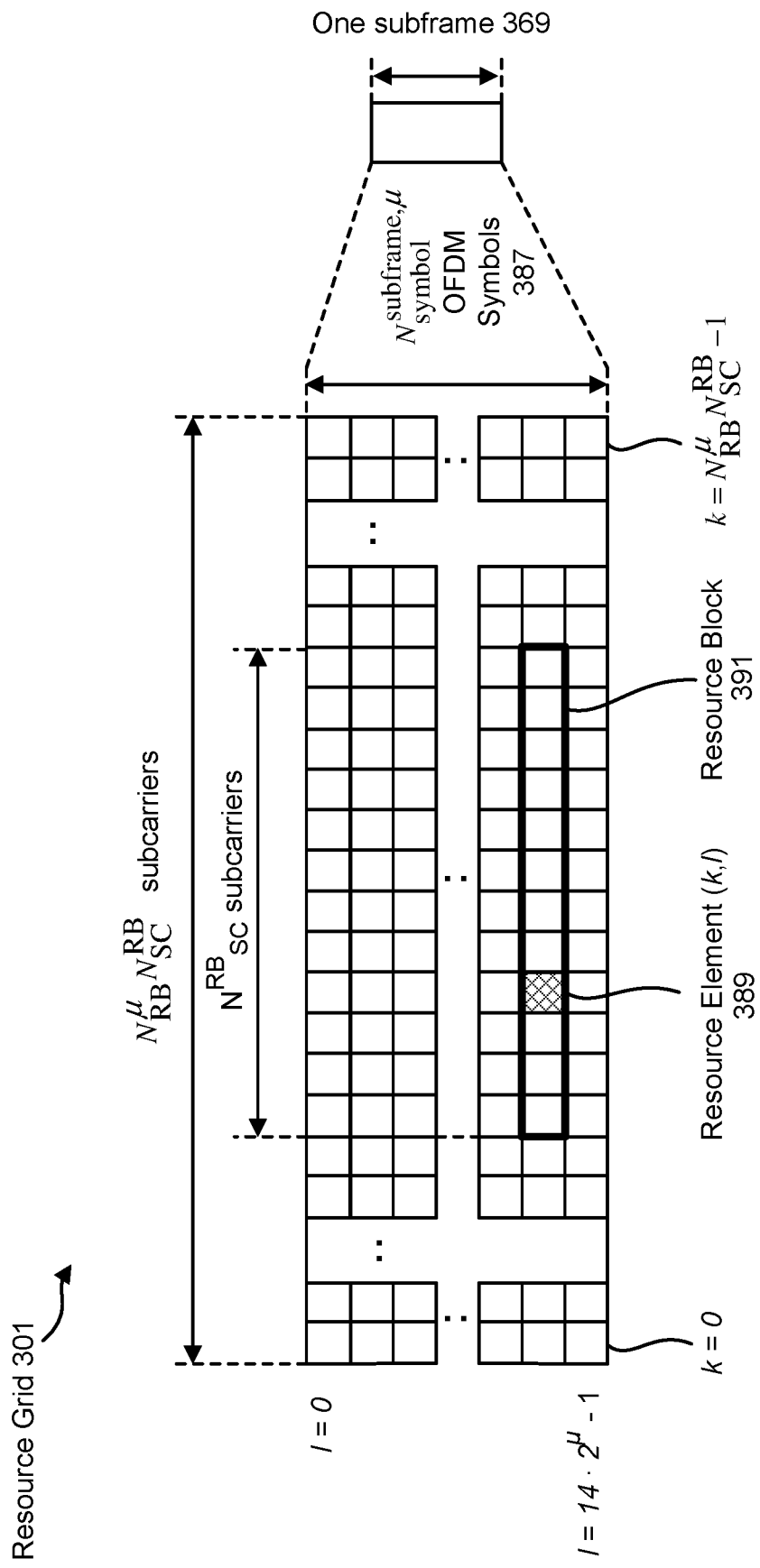
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which are also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform- Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains, respectively.

Each element in the resource grid 301 (e.g., antenna port p) and the subcarrier configuration μ is called a resource element 389 and is uniquely identified by the index pair (k,l) where $k=0, \ldots, N_{RB}^\mu N_{SC}^{RB}-1$ is the index in the frequency domain and l refers to the symbol position in the time domain. The resource element (k,l) 389 on the antenna port p and the subcarrier spacing configuration μ is denoted (k,l)p,μ. The physical resource block 391 is defined as $N_{SC}^{RB}=12$ consecutive subcarriers in the frequency domain. The physical resource blocks 391 are numbered from 0 to $N_{RB}^\mu-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

In the NR, the following reference signals may be defined:
NZP CSI-RS (non-zero power channel state information reference signal)
ZP CSI-RS (Zero-power channel state information reference signal)
DMRS (demodulation reference signal)
SRS (sounding reference signal)

NZP CSI-RS may be used for channel tracking (e.g., synchronization), measurement to obtain CSI (CSI measurement including channel measurement and interference measurement), and/or measurement to obtain the beam forming performance. NZP CSI-RS may be transmitted in the downlink (gNB to UE). NZP CSI-RS may be transmitted in an aperiodic or semi-persistent or periodic manner. Additionally, the NZP CSI-RS can be used for radio resource management (RRM) measurement and radio link control (RLM) measurement.

ZP CSI-RS may be used for interference measurement and transmitted in the downlink (gNB to UE). ZP CSI-RS may be transmitted in an aperiodic or semi-persistent or periodic manner.

DMRS may be used for demodulation for the downlink (gNB to UE), the uplink (UE to gNB), and the sideling (UE to UE).

SRS may be used for channel sounding and beam management. The SRS may be transmitted in the uplink (UE to gNB).

In some approaches, the DCI may be used. The following DCI formats may be defined:
DCI format 0_0
DCI format 0_1
DCI format 0_2
DCI format 1_0
DCI format 1_1
DCI format 1_2
DCI format 2_0
DCI format 2_1
DCI format 2_2
DCI format 2_3
DCI format 2_4
DCI format 2_5
DCI format 2_6
DCI format 3_0
DCI format 3_1

DCI format 1_0 may be used for the scheduling of PUSCH in one cell. The DCI may be transmitted by means of the DCI format 0_0 with cyclic redundancy check (CRC) scrambled by Cell Radio Network Temporary Identifiers (C-RNTI) or Configured Scheduling RNTI (CS-RNTI) or Modulation and Coding Scheme-Cell RNTI (MCS-C-RNTI).

DCI format 0_1 may be used for the scheduling of one or multiple PUSCH in one cell, or indicating configured grant downlink feedback information (CG-DFI) to a UE. The DCI may be transmitted by means of the DCI format 0_1 with CRC scrambled by C-RNTI or CS-RNTI or semi-persistent channel state information (SP-CSI-RNTI) or MCS-C-RNTI. The DCI format 0_2 may be used for CSI request (e.g., aperiodic CSI reporting or semi-persistent CSI request). The DCI format 0_2 may be used for SRS request (e.g., aperiodic SRS transmission).

DCI format 0_2 may be used for the scheduling of PUSCH in one cell. The DCI may be transmitted by means of the DCI format 0_2 with CRC scrambled by C-RNTI or CS-RNTI or SP-CSI-RNTI or MCS-C-RNTI. The DCI format 0_2 may be used for scheduling of PUSCH with high priority and/or low latency (e.g., URLLC). The DCI format 0_2 may be used for CSI request (e.g., aperiodic CSI reporting or semi-persistent CSI request). The DCI format 0_2 may be used for SRS request (e.g., aperiodic SRS transmission).

Additionally, for example, the DCI included in the DCI format 0_Y (Y=0, 1, 2, . . . ) may be a BWP indicator (e.g., for the PUSCH). Additionally or alternatively, the DCI included in the DCI format 0_Y may be a frequency domain resource assignment (e.g., for the PUSCH). Additionally or alternatively, the DCI included in the DCI format 0_Y may be a time domain resource assignment (e.g., for the PUSCH). Additionally or alternatively, the DCI included in the DCI format 0_Y may be a modulation and coding scheme (e.g., for the PUSCH). Additionally or alternatively, the DCI included in the DCI format 0_Y may be a new data indicator. Additionally or alternatively, the DCI included in the DCI format 0_Y may be a TPC command for scheduled PUSCH. Additionally or alternatively, the DCI included in the DCI format 0_Y may be a CSI request that is used for requesting the CSI reporting. Additionally or alternatively, as described below, the DCI included in the DCI format 0_Y may be information used for indicating an index of a configuration of a configured grant. Additionally or alternatively, the DCI included in the DCI format 0_Y may be the priority indication (e.g., for the PUSCH transmission and/or for the PUSCH reception).

DCI format 1_0 may be used for the scheduling of PDSCH in one DL cell. The DCI is transmitted by means of the DCI format 1_0 with CRC scrambled by C-RNTI or CS-RNTI or MCS-C-RNTI. The DCI format 1_0 may be used for random access procedure initiated by a PDCCH order. Additionally or alternatively, the DCI may be transmitted by means of the DCI format 1_0 with CRC scrambled by system information RNTI (SI-RNTI), and the DCI may be used for system information transmission and/or reception. Additionally or alternatively, the DCI may be transmitted by means of the DCI format 1_0 with CRC scrambled by random access RNTI (RA-RNTI) for random access response (RAR) (e.g., Msg 2) or msgB-RNTI for 2-step RACH. Additionally or alternatively, the DCI may be transmitted by means of the DCI format 1_0 with CRC scrambled by temporally cell RNTI (TC-RNTI), and the DCI may be used for msg3 transmission by a UE 102.

DCI format 1_1 may be used for the scheduling of PDSCH in one cell. The DCI may be transmitted by means of the DCI format 1_1 with CRC scrambled by C-RNTI or CS-RNTI or MCS-C-RNTI. The DCI format 1_1 may be used for SRS request (e.g., aperiodic SRS transmission).

DCI format 1_2 may be used for the scheduling of PDSCH in one cell. The DCI may be transmitted by means of the DCI format 1_2 with CRC scrambled by C-RNTI or CS-RNTI or SP-CSI-RNTI or MCS-C-RNTI. The DCI format 1_2 may be used for scheduling of PDSCH with high priority and/or low latency (e.g., URLLC). The DCI format 1_2 may be used for SRS request (e.g., aperiodic SRS transmission).

Additionally, for example, the DCI included in the DCI format 1_X may be a BWP indicator (e.g., for the PDSCH). Additionally or alternatively, the DCI included in the DCI format 1_X may be frequency domain resource assignment (e.g., for the PDSCH). Additionally or alternatively, the DCI included in the DCI format 1_X may be a time domain resource assignment (e.g., for the PDSCH). Additionally or alternatively, the DCI included in the DCI format 1_X may be a modulation and coding scheme (e.g., for the PDSCH). Additionally or alternatively, the DCI included in the DCI format 1_X may be a new data indicator. Additionally or alternatively, the DCI included in the DCI format 1_X may be a TPC command for scheduled PUCCH. Additionally or alternatively, the DCI included in the DCI format 1_X may be a CSI request that is used for requesting (e.g., triggering) transmission of the CSI (e.g., CSI reporting (e.g., aperiodic CSI reporting)). Additionally or alternatively, the DCI included in the DCI format 1_X may be a PUCCH resource indicator. Additionally or alternatively, the DCI included in the DCI format 1_X may be a PDSCH-to-HARQ feedback timing indicator. Additionally or alternatively, the DCI included in the DCI format 1_X may be the priority indication (e.g., for the PDSCH transmission and/or the PDSCH reception). Additionally or alternatively, the DCI included in the DCI format 1_X may be the priority indication (e.g., for the HARQ-ACK transmission for the PDSCH and/or the HARQ-ACK reception for the PDSCH).

DCI format 2_0 may be used for notifying the slot format, channel occupancy time (COT) duration for unlicensed band operation, available resource block (RB) set, and search space group switching. The DCI may transmitted by means of the DCI format 2_0 with CRC scrambled by slot format indicator RNTI (SFI-RNTI).

DCI format 2_1 may be used for notifying the physical resource block(s) (PRB(s)) and orthogonal frequency division multiplexing (OFDM) symbol(s) where the UE may assume no transmission is intended for the UE. The DCI is transmitted by means of the DCI format 2_1 with CRC scrambled by interrupted transmission RNTI (INT-RNTI).

DCI format 2_2 may be used for the transmission of transmission power control (TPC) commands for PUCCH and PUSCH. The following information is transmitted by means of the DCI format 2_2 with CRC scrambled by TPC-PUSCH-RNTI or TPC-PUCCH-RNTI. In a case that the CRC is scrambled by TPC-PUSCH-RNTI, the indicated one or more TPC commands may be applied to the TPC loop for PUSCHs. In a case that the CRC is scrambled by TPC-PUCCH-RNTI, the indicated one or more TPC commands may be applied to the TPC loop for PUCCHs.

DCI format 2_3 may be used for the transmission of a group of TPC commands for SRS transmissions by one or more UEs. Along with a TPC command, a SRS request may also be transmitted. The DCI may be is transmitted by means of the DCI format 2_3 with CRC scrambled by TPC-SRS-RNTI.

DCI format 2_4 may be used for notifying the PRB(s) and OFDM symbol(s) where the UE cancels the corresponding UL transmission. The DCI may be transmitted by means of the DCI format 2_4 with CRC scrambled by cancellation indication RNTI (CI-RNTI).

DCI format 2_5 may be used for notifying the availability of soft resources for integrated access and backhaul (IAB) operation. The DCI may be transmitted by means of the DCI format 2_5 with CRC scrambled by availability indication RNTI (AI-RNTI).

DCI format 2_6 may be used for notifying the power saving information outside discontinuous reception (DRX) Active Time for one or more UEs. The DCI may transmitted by means of the DCI format 2_6 with CRC scrambled by power saving RNTI (PS-RNTI).

DCI format 3_0 may be used for scheduling of NR physical sidelink control channel (PSCCH) and NR physical sidelink shared channel (PSSCH) in one cell. The DCI may be transmitted by means of the DCI format 3_0 with CRC scrambled by sidelink RNTI (SL-RNTI) or sidelink configured scheduling RNTI (SL-CS-RNTI). This may be used for vehicular to everything (V2X) operation for NR V2X UE(s).

DCI format 3_1 may be used for scheduling of LTE PSCCH and LTE PSSCH in one cell. The following information is transmitted by means of the DCI format 3_1 with CRC scrambled by SL-L-CS-RNTI. This may be used for LTE V2X operation for LTE V2X UE(s).

The UE 102 may monitor one or more DCI formats on common search space set (CSS) and/or UE-specific search space set (USS). A set of PDCCH candidates for a UE to monitor may be defined in terms of PDCCH search space sets. A search space set can be a CSS set or a USS set. A UE 102 monitors PDCCH candidates in one or more of the following search spaces sets. The search space may be defined by a PDCCH configuration in a RRC layer.

A Type0-PDCCH CSS set may be configured by pdcch-ConfigSIB1 in MIB or by searchSpaceSIB1 in PDCCH-ConfigCommon or by searchSpaceZero in PDCCH-Config-Common for a DCI format with CRC scrambled by a SI-RNTI on the primary cell of the MCG A Type0A-PDCCH CSS set may be configured by searchSpaceOtherSystemInformation in PDCCH-Config-Common for a DCI format with CRC scrambled by a SI-RNTI on the primary cell of the MCG A Type1-PDCCH CSS set may be configured by ra-SearchSpace in PDCCH-ConfigCommon for a DCI format with CRC scrambled by a RA-RNTI or a TC-RNTI on the primary cell A Type2-PDCCH CSS set may be configured by pagingSearchSpace in PDCCH-ConfigCommon for a DCI format with CRC scrambled by a P-RNTI on the primary cell of the MCG A Type3-PDCCH CSS set may be configured by SearchSpace in PDCCH-Config with searchSpaceType= common for DCI formats with CRC scrambled by INT-RNTI, SFI-RNTI, TPC-PUSCH-RNTI, TPC-PUCCH- RNTI, TPC-SRS-RNTI, CI-RNTI, or PS-RNTI and, only for the primary cell, C-RNTI, MCS-C-RNTI, or CS-RNTI(s), and A USS set may be configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

The UE 102 may monitor a set of candidates of the PDCCH in one or more control resource sets (e.g., CORE-SETs) on the active DL bandwidth part (BWP) on each activated serving cell according to corresponding search space sets. The CORESETs may be configured from gNB 160 to a UE 102, and the CSS set(s) and the USS set(s) are defined in the configured CORESET. One or more CORE-SET may be configured in a RRC layer.

Figure 4:
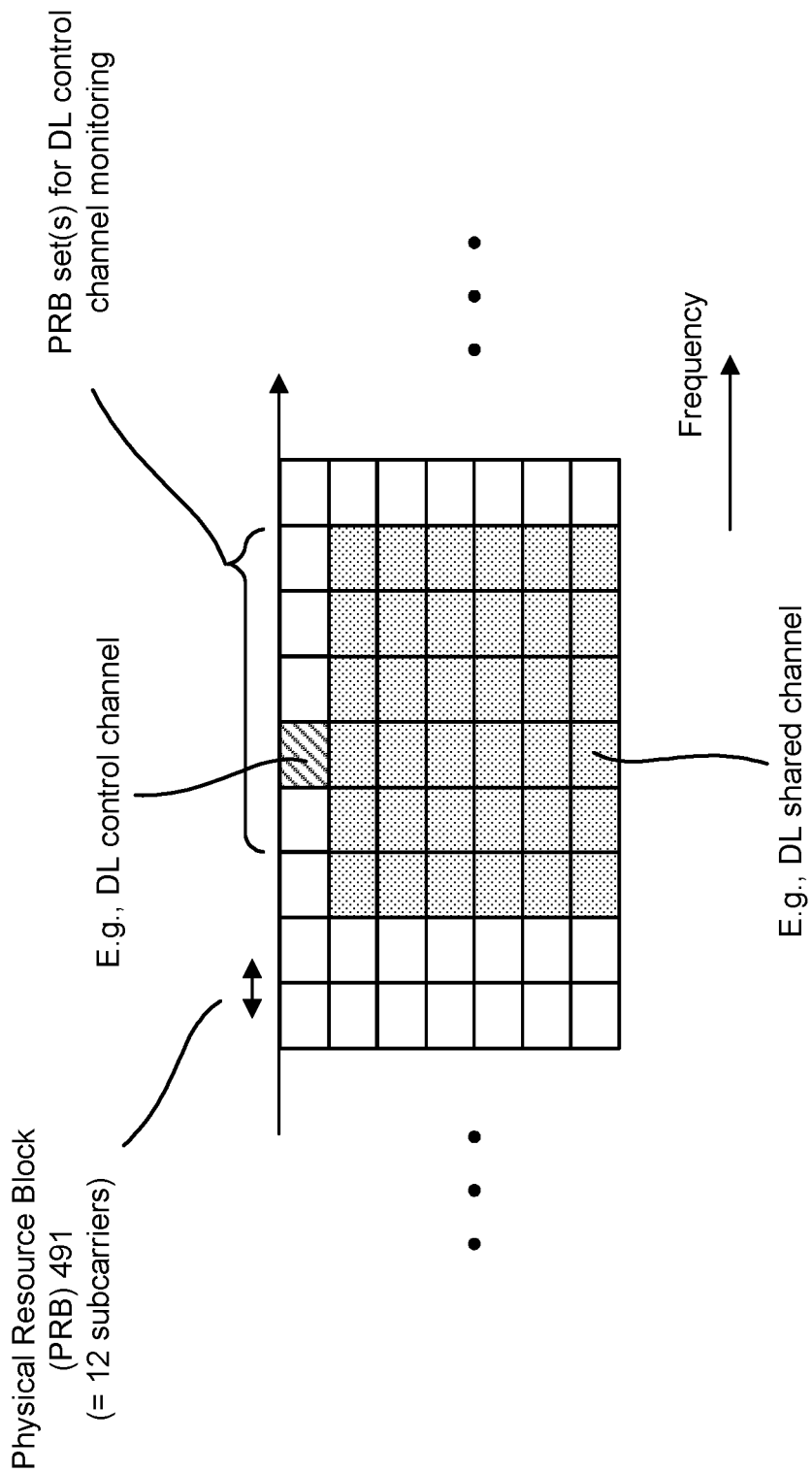
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel.

Figure 5:
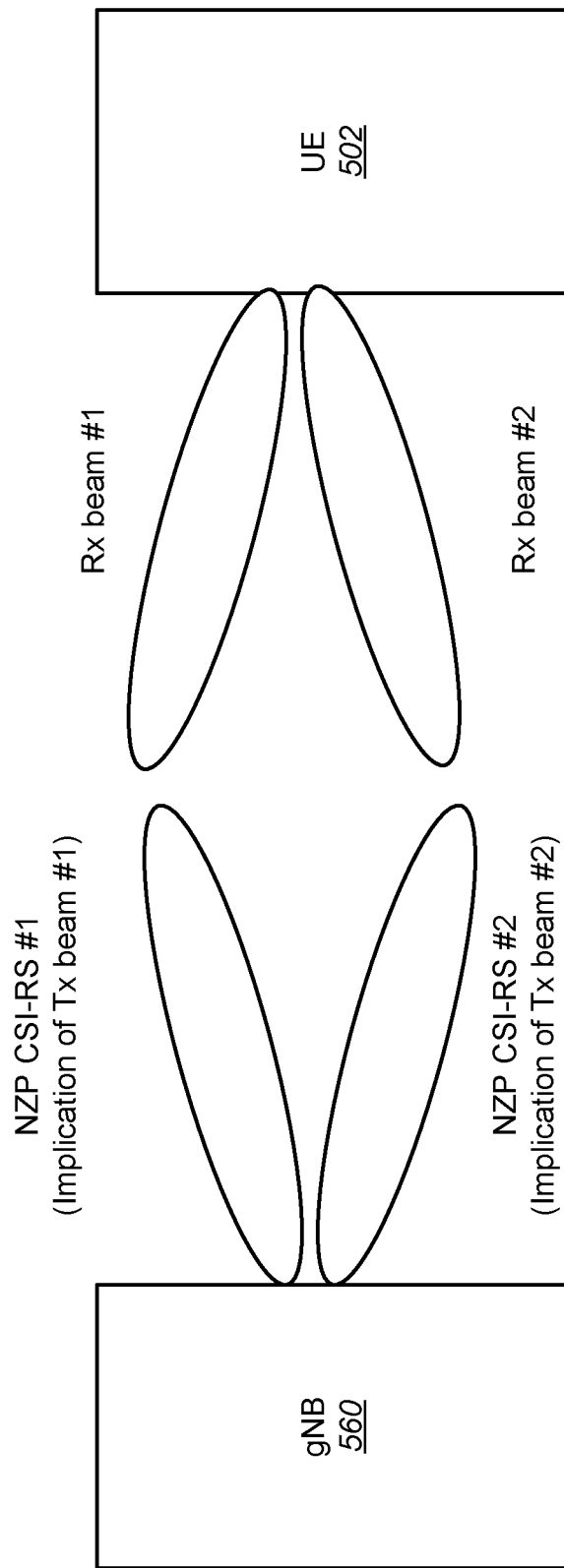
FIG. 5 illustrates an example of beamforming and quasi-colocation (QCL) type.

FIG. 5 illustrates an example of beamforming and quasi-colocation (QCL) type. In NR, the gNB 560 and UE 502 may perform beamforming by having multiple antenna elements. The beamforming is operated by using a directional antenna(s) or applying phase shift for each antenna element (e.g., a high electric field strength to a certain spatial direction can be achieved). In some examples, the beamforming or beam may be rephrased by "spatial domain transmission filter" or "spatial domain filter."

In the downlink, the gNB 560 may apply the transmission beamforming and transmit the DL channels and/or DL signals and a UE 502 may also apply the reception beamforming and receive the DL channels and/or DL signals.

In the uplink, a UE 560 may apply the transmission beamforming and transmit the UL channels and/or UL signals and a gNB 560 may also apply the reception beamforming and receive the UL channels and/or UL signals.

The beam correspondence may be defined according to the UE capability. In some examples, the beam correspondence may be defined in accordance with the following. In the downlink, a UE 502 can decide the transmission beamforming for UL channels and/or UL signals from the reception beamforming for DL channels and/or DL signals. In the uplink, a gNB 560 can decide the transmission beamforming for DL channels and/or DL signals from the reception beamforming for UL channels and/or UL signals.

To adaptively switch, refine, or operate beamforming, beam management may be performed. For the beam management, NZP-CSI-RS(s) and SRS(s) may be used to measure the channel quality in the downlink and uplink, respectively. Specifically, in the downlink, gNB 560 may transmit one or more NZP CSI-RSs. The UE 502 may measure the one or more NZP CSI-RSs. In addition, the UE 502 may change the beamforming to receive each NZP CSI-RS. The UE 502 can identify which combination of transmission beamforming at gNB side corresponding to NZP CSI-RS corresponding and the reception beamforming at the UE side. In the uplink, a UE 502 may transmit one or more SRSs. The gNB 502 measure the one or more SRSs. In addition, the gNB 560 may change the reception beamforming to receive each SRS. The gNB 560 can identify which combination of transmission beamforming at gNB side corresponding to SRS corresponding and the reception beamforming at the gNB side.

To keep the link with transmission beam and reception for the communication between a gNB 560 and a UE 502, the quasi-colocation (QCL) assumption may be defined. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. The following QCL types may be defined:

QCL type A ('QCL-TypeA'): {Doppler shift, Doppler spread, average delay, delay spread}

QCL type B ('QCL-TypeB'): {Doppler shift, Doppler spread}

QCL type C ('QCL-TypeC'): {Doppler shift, average delay}

QCL type D ('QCL-TypeD') {Spatial Rx parameter}

QCL type D is related to the beam management. For example, two NZP CSI-RS resources are configured to a UE 502 and a NZP CSI-RS resource #1 and a NZP CSI-RS resource #2 are used for beam #1 and beam #2, respectively. At a UE side, Rx beam #1 is used for the reception of the NZP CSI-RS #1 and Rx beam #2 is used for reception of the NZP CSI-RS #2 for beam management. Here, the NZP CSI-RS resource #1 and NZP CSI-RS resource #2 imply Tx beam #1 and Tx beam #2, respectively. QCL type D assumption may be used for PDCCH and PDSCH and DL signals reception. When a UE 502 receives a PDCCH with the QCL type D assumption of NZP CSI-RS #1, the UE 502 may use the Rx beam #2 for the PDCCH reception.

For this purpose, a gNB 560 may configure transmission configuration indication (TCI) states to a UE 502. A TCI state may include the following:

One or more reference resource indices;

QCL type for each of the one or more reference resource indices.

For example, if a TCI state includes QCL type D and NZP CSI-RS #1 and indicated to the UE 502, the UE 502 may apply Rx beam #1 to the reception of a PDCCH, a PDSCH, and/or DL signal(s). In other words, a UE 502 can determine the reception beam by using TCI states for reception of PDCCH, PDSCH, and/or DL signals.

FIG. 6 illustrates an example of transmission configuration indication (TCI) states. The seven TCI states may be configured and one of the configured TCI states may be used to receive PDCCH, PDSCH, and/or DL signals. For example, if gNB 560 indicates TCI state #1, a UE 502 may assume the PDCCH, PDSCH, and/or DL signals is (are) quasi-colocated with the NZP CSI-RS corresponding to the NZP CSI-RS resource #1. A UE 502 may determine to use the reception beam when the UE 502 receives the NZP CSI-RS corresponding to the NZP CSI-RS resource #1.

Next, how to indicate one TCI state to a UE 502 from gNB 560. In the RRC messages, N TCI states may be configured by a RRC message. A gNB 560 may indicate one of the configured TCI states by DCI (e.g., DCI format 1_1 or DCI format 1_2). Alternatively or additionally, the gNB 560 may indicate one of the configured TCI by MAC CE.

Alternatively or additionally, the MAC CE selects more than one TCI states from the configured TCI states and DCI indicates one of the more than one TCI states activated by MAC CE.

Figure 7:
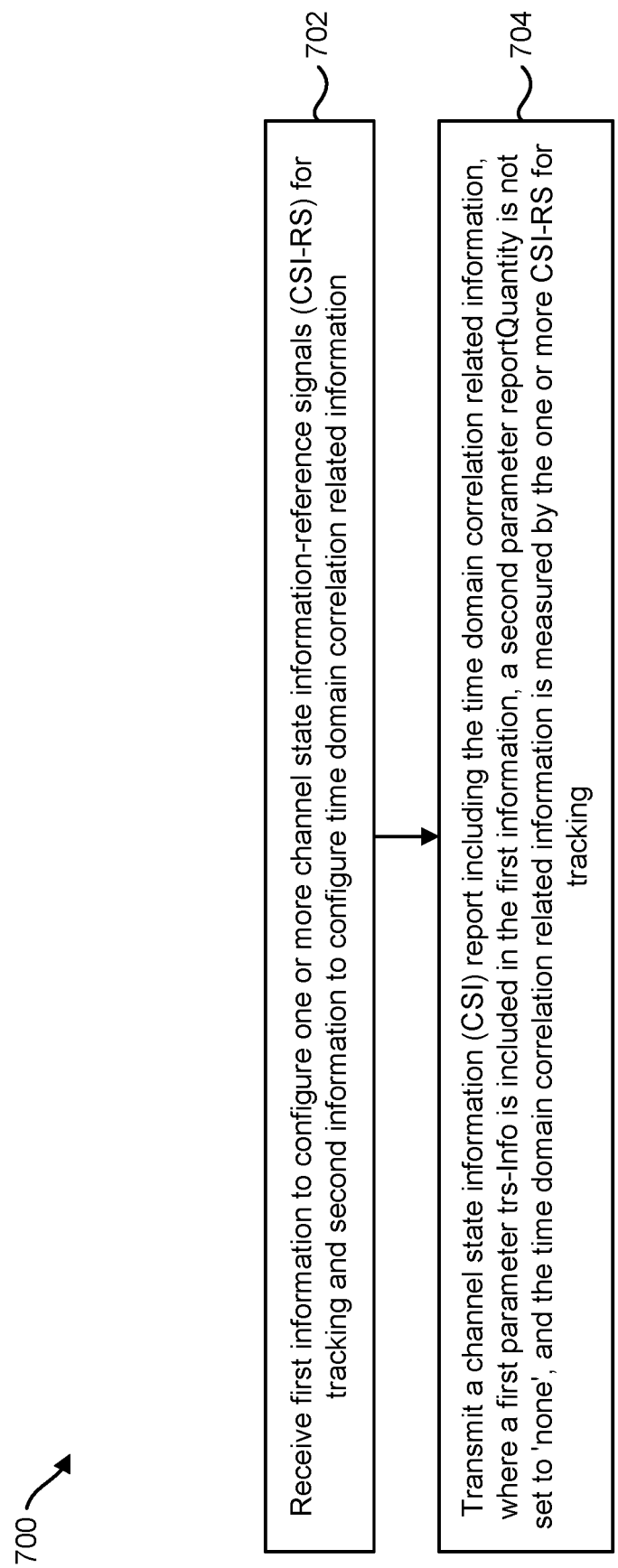
FIG. 7 is a flow diagram illustrating an example of a method in accordance with some of the techniques described herein.

FIG. 7 is a flow diagram illustrating an example of a method 700 in accordance with some of the techniques described herein. In some examples, the method 700 may be performed by the UE 102 described in relation to FIG. 1.

The UE may receive 702 first information to configure one or more CSI-RS for tracking and second information to configure time domain correlation related information. In some examples, this may be performed as described in relation to FIG. 1.

The UE may transmit 704 a CSI report including the time domain correlation related information. A first parameter trs-Info may be included in the first information. A second parameter reportQuantity may not be set to 'none'. The time domain correlation related information may be measured by the one or more CSI-RS for tracking. In some examples, this may be performed as described in relation to FIG. 1.

Figure 8:
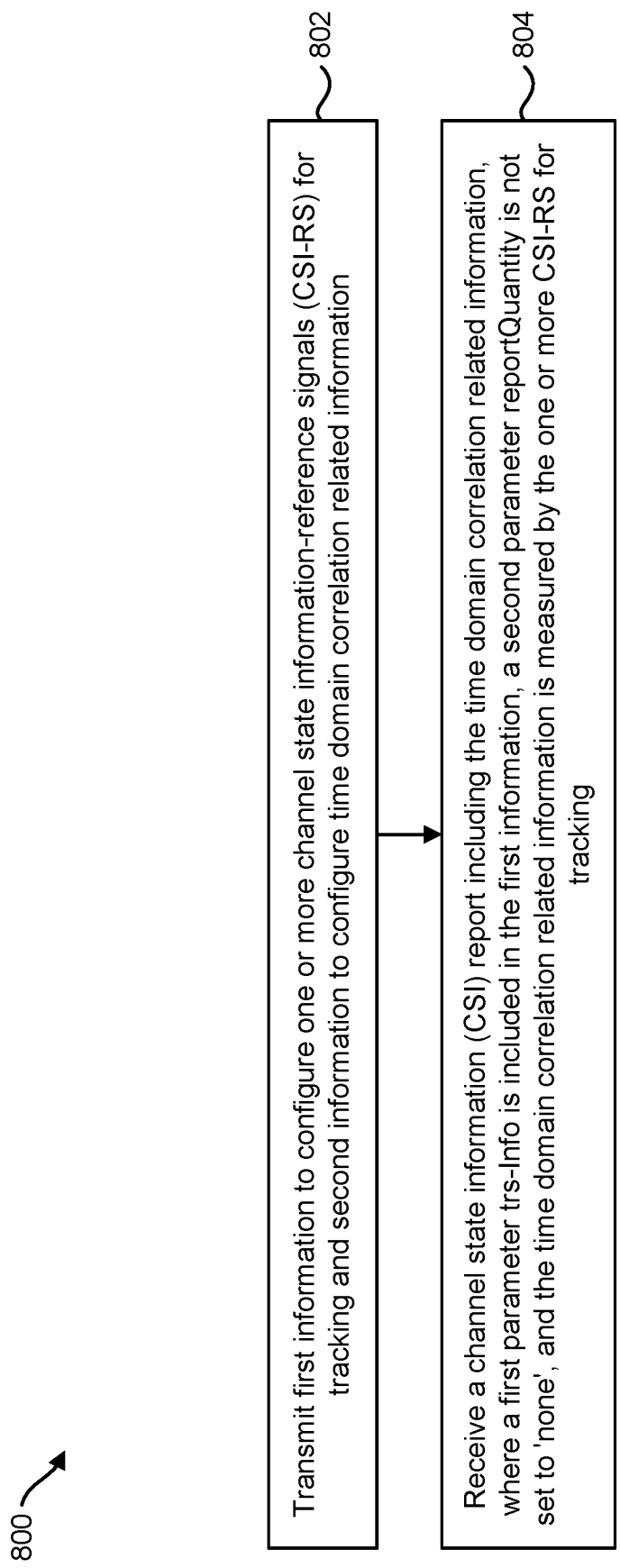
FIG. 8 is a flow diagram illustrating an example of a method in accordance with some of the techniques described herein.

FIG. 8 is a flow diagram illustrating an example of a method 800 in accordance with some of the techniques described herein. In some examples, the method 800 may be performed by the gNB 160 described in relation to FIG. 1.

The gNB may transmit 802 first information to configure one or more CSI-RS for tracking and second information to configure time domain correlation related information. In some examples, this may be performed as described in relation to FIG. 1.

The gNB may receive 804 a CSI report including the time domain correlation related information. A first parameter trs-Info may be included in the first information. A second parameter reportQuantity may not be set to 'none'. The time domain correlation related information may be measured by the one or more CSI-RS for tracking. In some examples, this may be performed as described in relation to FIG. 1.

Figures 9A, 9B:
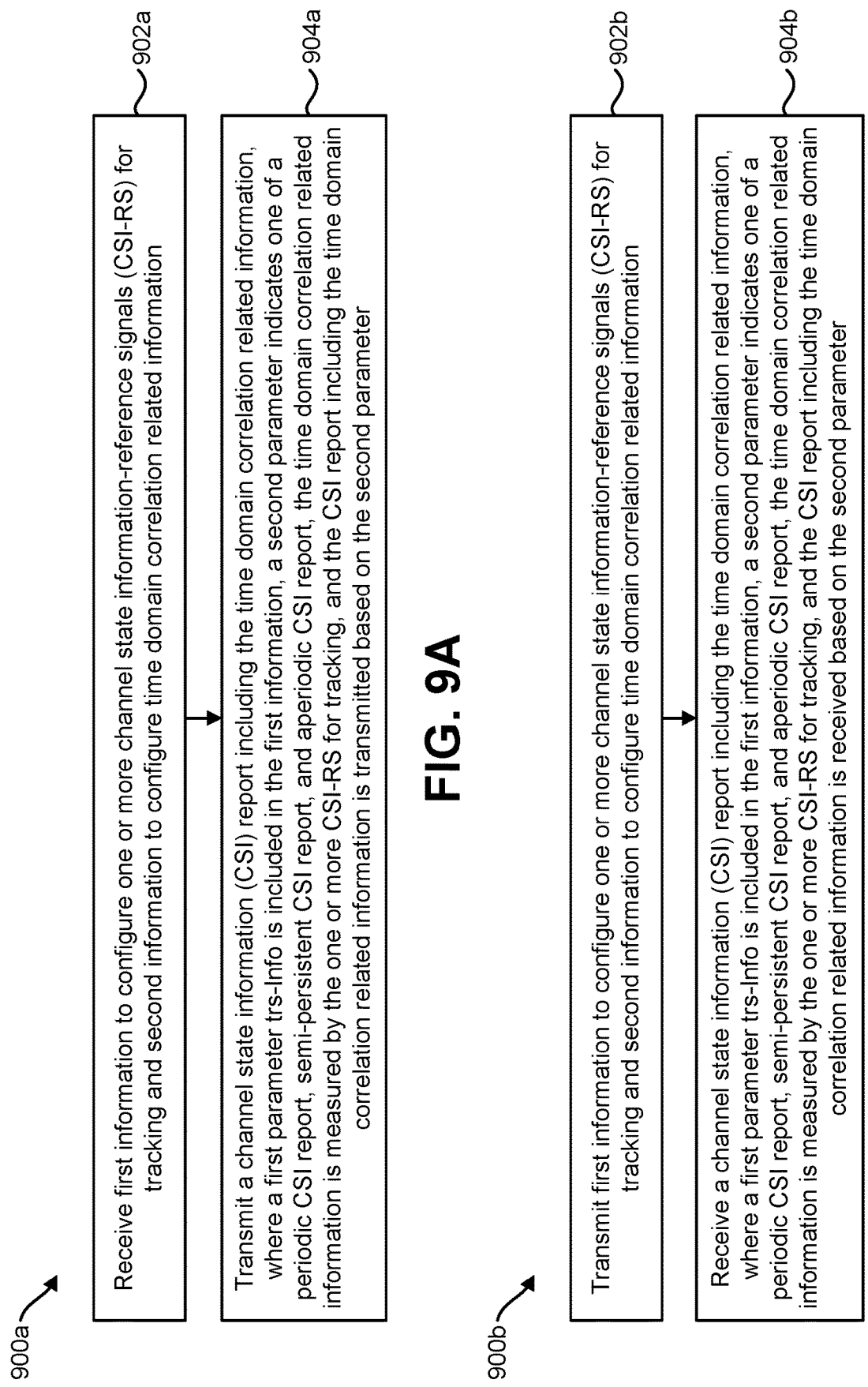
FIG. 9A is a flow diagram illustrating an example of a method in accordance with some of the techniques described herein.
FIG. 9B is a flow diagram illustrating an example of a method in accordance with some of the techniques described herein.

FIG. 9A is a flow diagram illustrating an example of a method 900a in accordance with some of the techniques described herein. In some examples, the method 900a may be performed by the UE 102 described in relation to FIG. 1.

The UE may receive 902a first information to configure one or more CSI-RS for tracking and second information to configure time domain correlation related information. In some examples, this may be performed as described in relation to FIG. 1.

The UE may transmit 904a a CSI report including the time domain correlation related information. A first parameter trs-Info may be included in the first information. A second parameter may indicate one of a periodic CSI report, semi-persistent CSI report, and aperiodic CSI report. The time domain correlation related information may be measured by the one or more CSI-RS for tracking. The CSI report including the time domain correlation related information may be transmitted based on the second parameter. In some examples, this may be performed as described in relation to FIG. 1.

FIG. 9B is a flow diagram illustrating an example of a method 900b in accordance with some of the techniques described herein. In some examples, the method 900b may be performed by the gNB 160 described in relation to FIG. 1.

The gNB may transmit 902b first information to configure one or more CSI-RS for tracking and second information to configure time domain correlation related information. In some examples, this may be performed as described in relation to FIG. 1.

The gNB may receive 904b a CSI report including the time domain correlation related information. A first parameter trs-Info may be included in the first information. A second parameter may indicate one of periodic CSI report, semi-persistent CSI report, and aperiodic CSI report. The time domain correlation related information may be measured by the one or more CSI-RS for tracking. The CSI report including the time domain correlation related information may be received based on the second parameter. In some examples, this may be performed as described in relation to FIG. 1.

Figure 10:
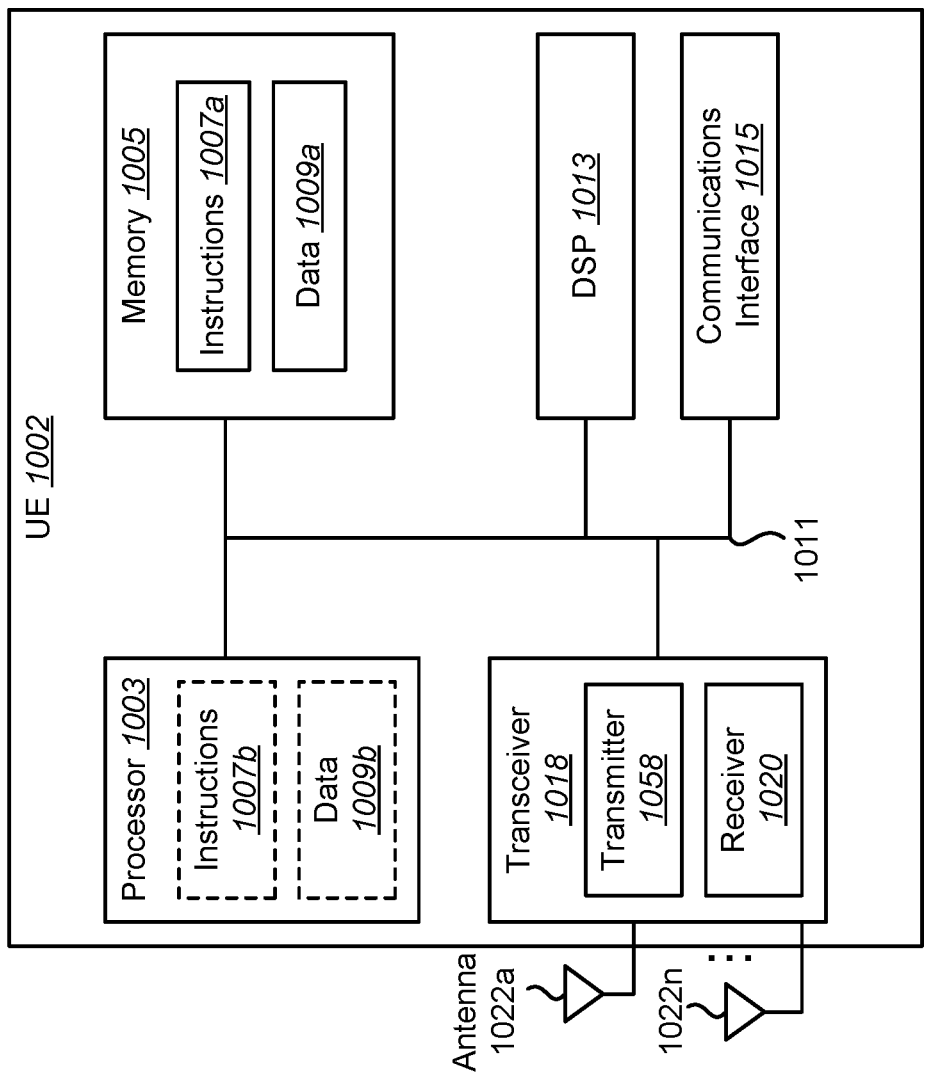
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described herein.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 10 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 10 is a functional block diagram rather than a listing of specific components.

Figure 11:
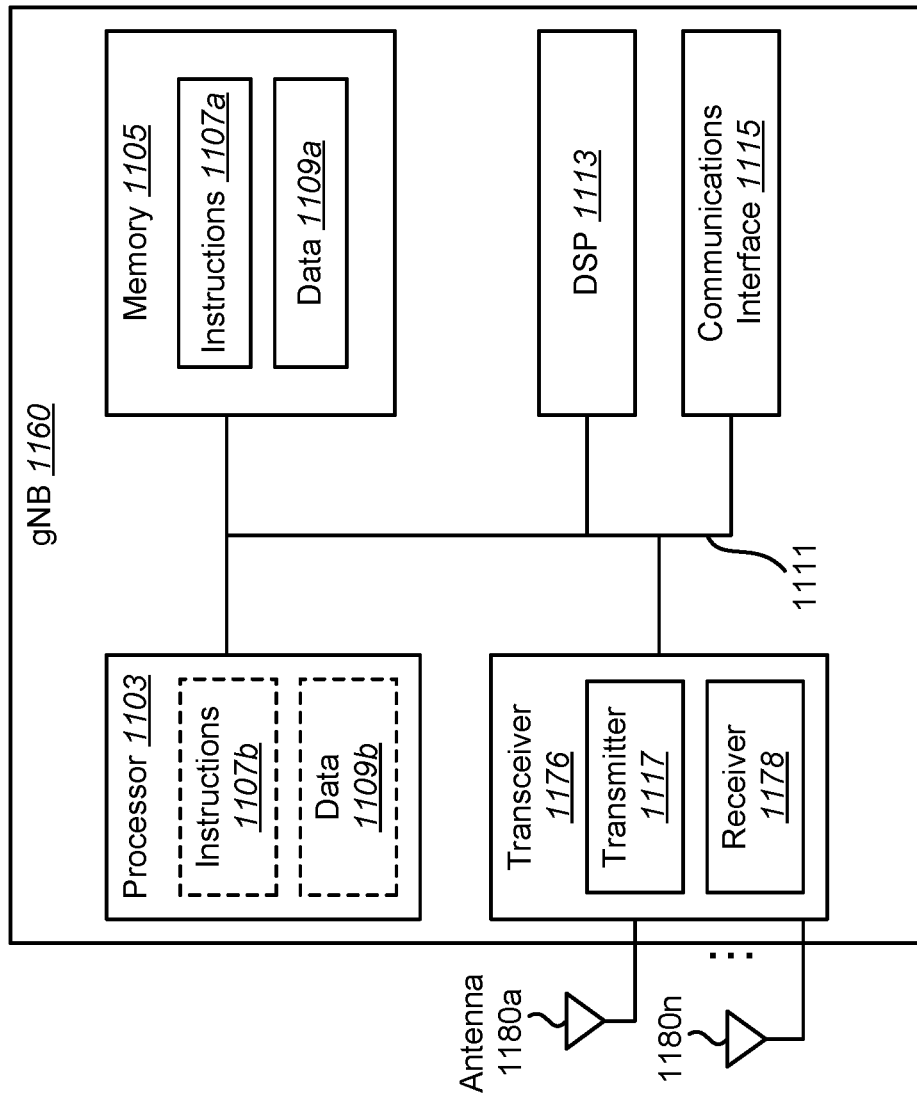
FIG. 11 illustrates various components that may be utilized in a gNB.

FIG. 11 illustrates various components that may be utilized in a gNB 1160. The gNB 1160 described in connection with FIG. 11 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described herein.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180*a-n* are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 11 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 11 is a functional block diagram rather than a listing of specific components.

Figure 12:
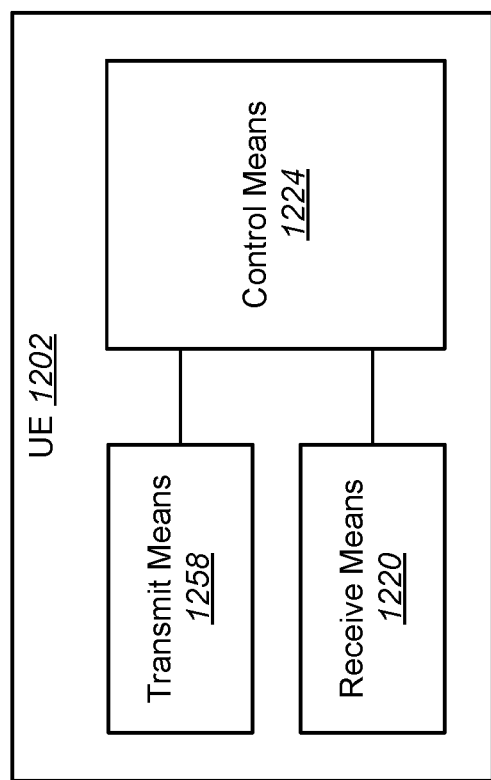
FIG. 12 is a block diagram illustrating one implementation of a UE in which one or more of the systems and/or methods described herein may be implemented.

FIG. 12 is a block diagram illustrating one implementation of a UE 1202 in which one or more of the systems and/or methods described herein may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
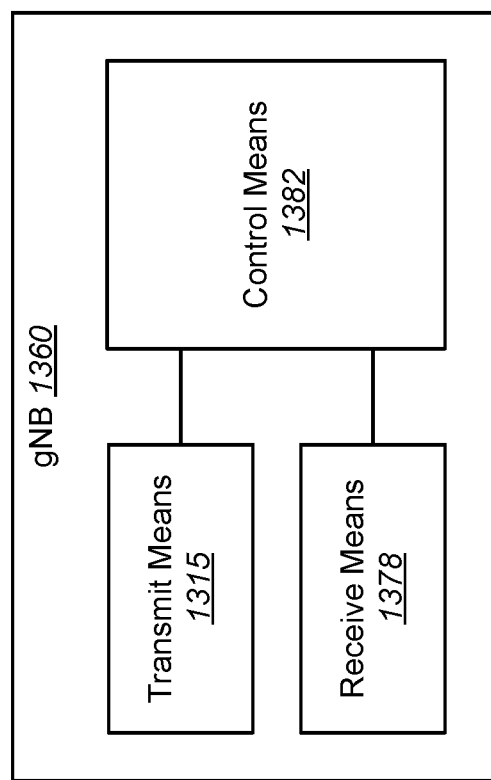
FIG. 13 is a block diagram illustrating one implementation of a gNB in which one or more of the systems and/or methods described herein may be implemented.

FIG. 13 is a block diagram illustrating one implementation of a gNB 1360 in which one or more of the systems and/or methods described herein may be implemented. The gNB 1360 includes transmit means 1317, receive means 1378 and control means 1382. The transmit means 1317, receive means 1378 and control means 1382 may be configured to perform one or more of the functions described in connection with FIG. 1 above. FIG. 11 above illustrates one example of a concrete apparatus structure of FIG. 13. Other various structures may be implemented to realize one or more of the functions of FIG. 1. For example, a DSP may be realized by software.

Figure 14:
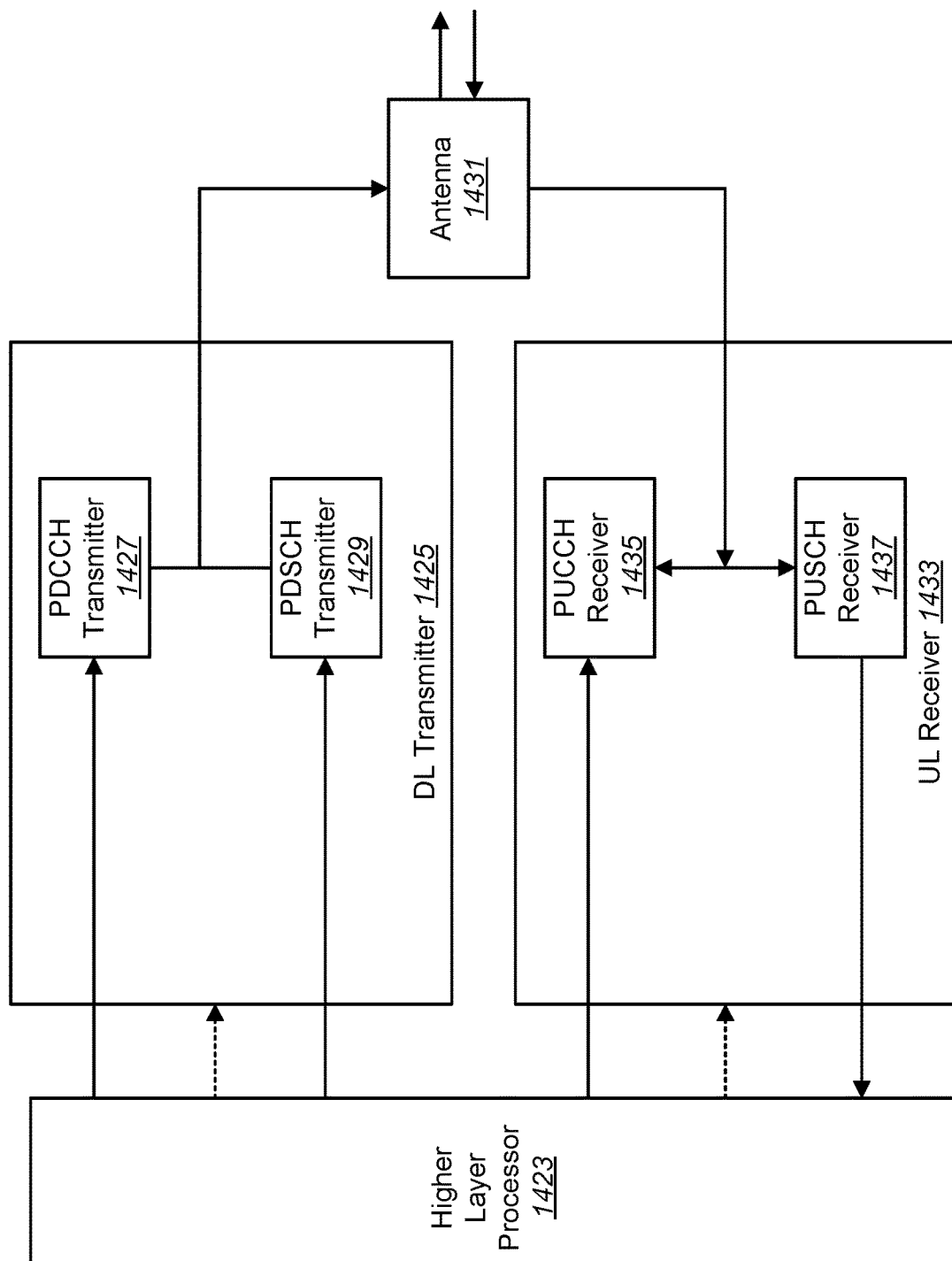
FIG. 14 is a block diagram illustrating one implementation of a gNB.

FIG. 14 is a block diagram illustrating one implementation of a gNB 1460. The gNB 1460 may be an example of the gNB 160 described in connection with FIG. 1. The gNB 1460 may include a higher layer processor 1423, a DL transmitter 1425, a UL receiver 1433, and one or more antenna 1431. The DL transmitter 1425 may include a PDCCH transmitter 1427 and a PDSCH transmitter 1429. The UL receiver 1433 may include a PUCCH receiver 1435 and a PUSCH receiver 1437.

The higher layer processor 1423 may manage physical layer's behaviors (the DL transmitter's and the UL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PDSCH transmitter transport blocks and provide the PDCCH transmitter transmission parameters related to the transport blocks.

The DL transmitter 1425 may multiplex downlink physical channels and downlink physical signals (including reservation signal) and transmit them via transmission antennas 1431. The UL receiver 1433 may receive multiplexed uplink physical channels and uplink physical signals via receiving antennas 1431 and de-multiplex them. The PUCCH receiver 1435 may provide the higher layer processor 1423 UCI. The PUSCH receiver 1437 may provide the higher layer processor 1423 received transport blocks.

Figure 15:
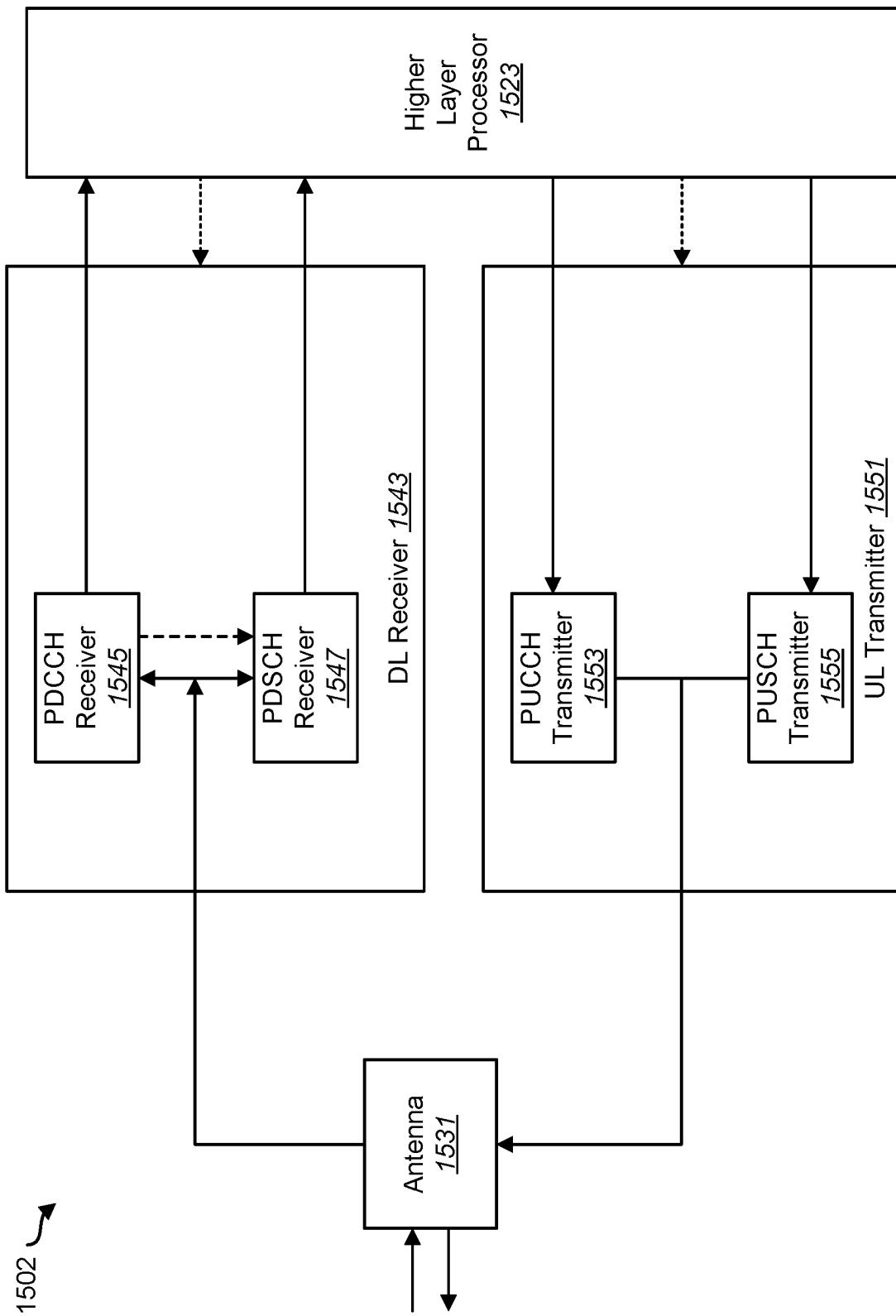
FIG. 15 is a block diagram illustrating one implementation of a UE.

FIG. 15 is a block diagram illustrating one implementation of a UE 1502. The UE 1502 may be an example of the UE 102 described in connection with FIG. 1. The UE 1502 may include a higher layer processor 1523, a UL transmitter 1551, a DL receiver 1543, and one or more antenna 1531. The UL transmitter 1551 may include a PUCCH transmitter 1553 and a PUSCH transmitter 1555. The DL receiver 1543 may include a PDCCH receiver 1545 and a PDSCH receiver 1547.

The higher layer processor 1523 may manage physical layer's behaviors (the UL transmitter's and the DL receiver's behaviors) and provide higher layer parameters to the physical layer. The higher layer processor 1523 may obtain transport blocks from the physical layer. The higher layer processor 1523 may send/acquire higher layer messages such as an RRC message and MAC message to/from a UE's higher layer. The higher layer processor 1523 may provide the PUSCH transmitter transport blocks and provide the PUCCH transmitter 1553 UCI.

The DL receiver 1543 may receive multiplexed downlink physical channels and downlink physical signals via receiving antennas 1531 and de-multiplex them. The PDCCH receiver 1545 may provide the higher layer processor 1523 DCI. The PDSCH receiver 1547 may provide the higher layer processor 1523 received transport blocks.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE) comprising:
 receiving circuitry configured to receive first information to configure one or more non-zero power channel state information reference signal (CSI-RS) resources and second information to configure CSI reporting,
 measurement circuitry configured to measure time domain correlation related information based on the second information, and
 transmitting circuitry configured to transmit a channel state information (CSI) report including the time domain correlation related information based on the second information,
 wherein:
  the second information is associated with the first information,
  the first information includes a first parameter trs-Info, the first parameter trs-Info indicates the one or more CSI-RS resources for tracking in the time and frequency domain,
  the second information includes a second parameter reportQuantity indicating a kind of CSI is set to 'TDCI', and
  the 'TDCI' indicates time domain correlation related information.

2. A base station comprising:
 transmitting circuitry configured to transmit first information to configure one or more non-zero power channel state information reference signal (CSI-RS) resources and second information to configure CSI reporting, and
 receiving circuitry configured to receive a channel state information (CSI) report including the time domain correlation related information based on the second information,
 wherein:
  the second information is associated with the first information,
  the first information includes a first parameter trs-Info, the first parameter trs-Info indicates the one or more CSI-RS resources for tracking in the time and frequency domain,
  the second information includes a second parameter reportQuantity indicating a kind of CSI is set to 'TDCI', and
  the 'TDCI' indicates time domain correlation related information.

3. A communication method of a user equipment (UE) comprising:
 receiving first information to configure one or more non-zero power channel state information reference signal (CSI-RS) resources and second information to configure CSI reporting,
 measuring time domain correlation related information based on the second information, and transmitting a channel state information (CSI) report including the time domain correlation related information based on the second information, wherein:
the second information is associated with the first information,
the first information includes a first parameter trs-Info, the first parameter trs-Info indicates the one or more CSI-RS resources for tracking in the time and frequency domain,
the second information includes a second parameter reportQuantity indicating a kind of CSI is set to 'TDCI', and
the 'TDCI' indicates time domain correlation related information.

* * * * *